Oct. 5, 1943.     R. A. ACKLEY     2,331,153
RING BALANCE METER
Filed Nov. 30, 1939     5 Sheets-Sheet 1

Inventor
Robert A. Ackley
by Booth & MacDuff
Attorneys

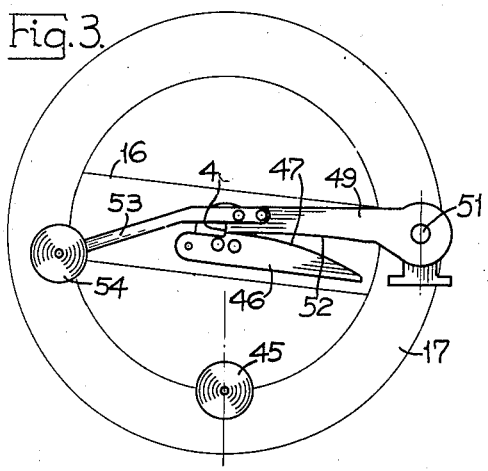
Fig. 3.
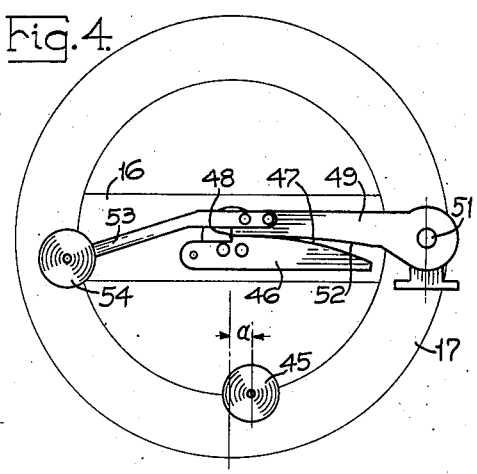
Fig. 4.
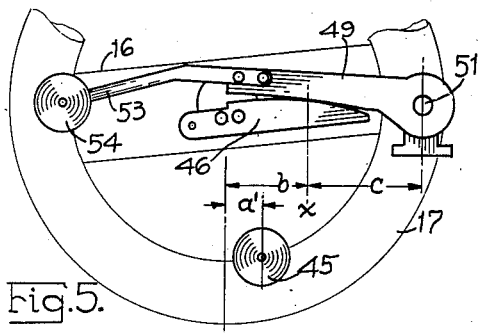
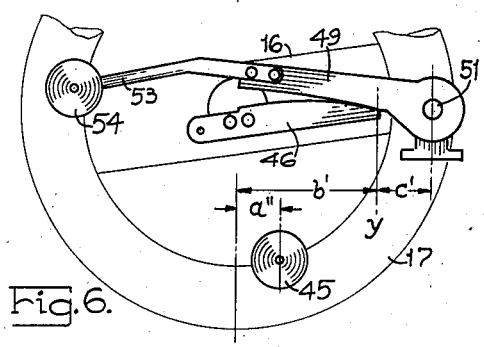
Fig. 5.
Fig. 6.
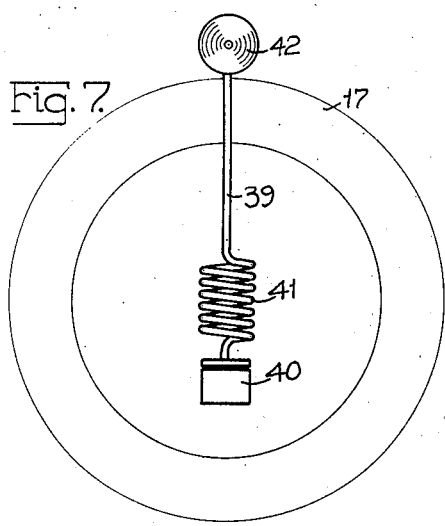
Fig. 7.
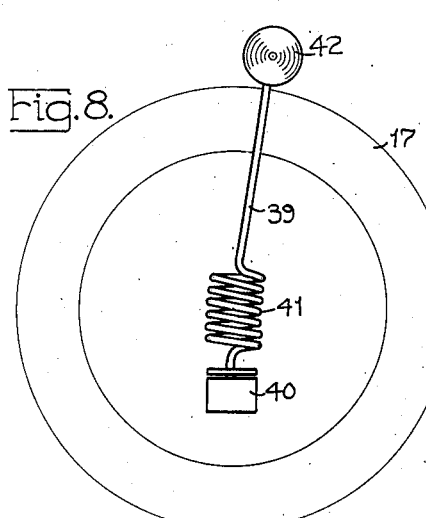
Fig. 8.
Inventor
Robert A. Ackley
by Booth & MacDuff
Attorneys Oct. 5, 1943.   R. A. ACKLEY   2,331,153
RING BALANCE METER
Filed Nov. 30, 1939   5 Sheets-Sheet 4

Inventor
Robert A. Ackley
by Booth & MacDuff
Attorneys

Oct. 5, 1943.                R. A. ACKLEY                2,331,153
                           RING BALANCE METER
                           Filed Nov. 30, 1939            5 Sheets-Sheet 5
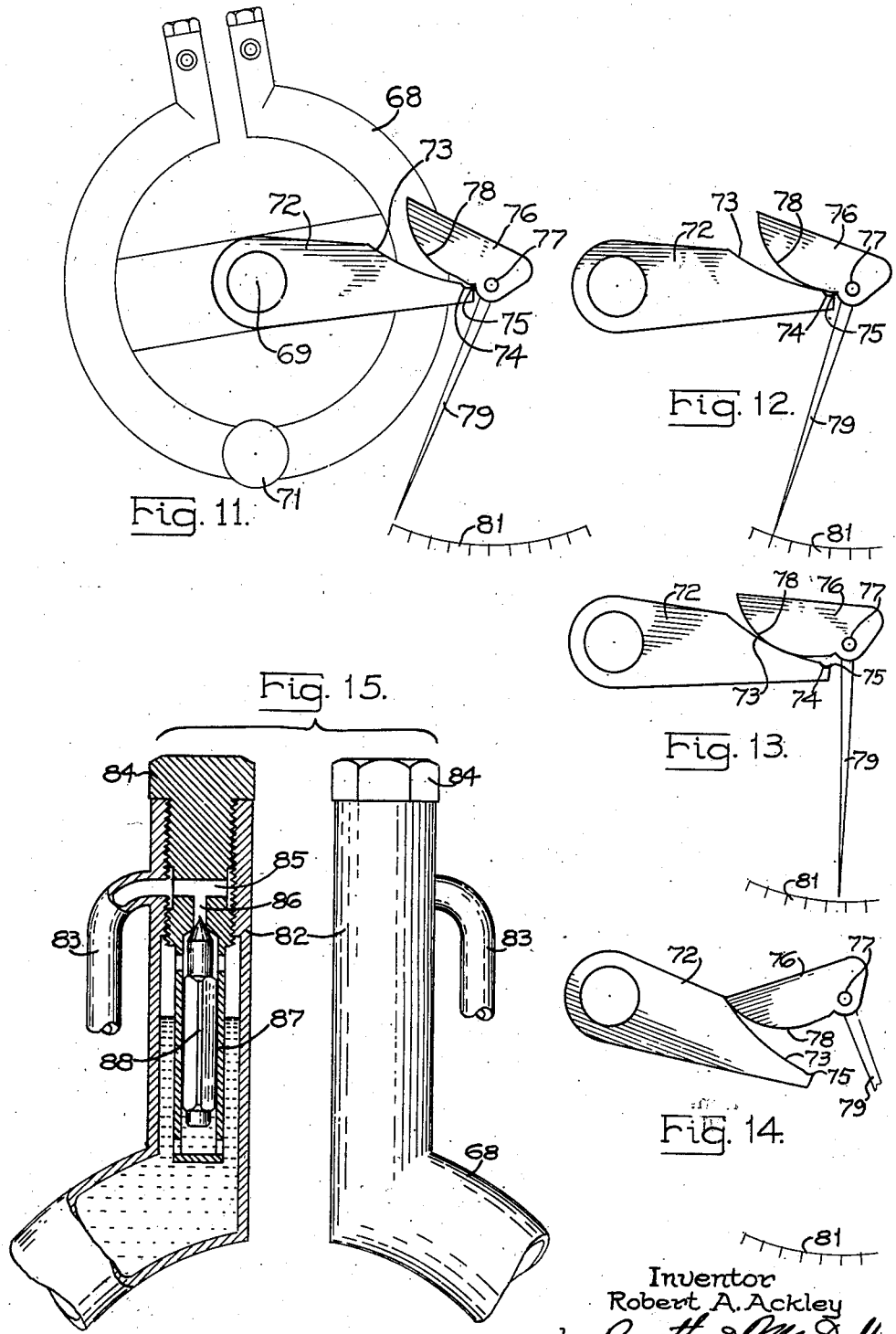
Inventor
Robert A. Ackley
by Booth & MacDuff
Attorneys Patented Oct. 5, 1943

2,331,153

UNITED STATES PATENT OFFICE 2,331,153

RING BALANCE METER

Robert A. Ackley, Chicago, Ill., assignor to Republic Flow Meters Company, Chicago, Ill., a corporation of Illinois Application November 30, 1939, Serial No. 306,875

13 Claims. (Cl. 73—31)

This invention relates to meters and more particularly to differential fluid pressure meters.

One of the objects of the invention is to provide a meter which will stand a pressure differential greater than the range it is designed to measure without damage. In a meter employing a sealing liquid which is displaced by the differential pressure this means that the liquid is prevented from blowing out until a differential is reached substantially in excess of that which the meter is designed to measure.

Another object of the invention is to provide a meter which may be easily filled with sealing liquid. According to one important feature the meter may be incased and may easily be filled without the necessity of removing it from the casing.

Still another object of the invention is to provide a meter having a movable body in which pressure may be conducted to the body without the use of sliding joints or the like. This object is preferably accomplished by providing elongated tubes communicating with the body and bending laterally as the body moves. Since the lateral resistance of the tubes is constant it may readily be compensated for.

Yet another object of the invention is to provide a meter having a movable body whose motion is variably resisted by a cam mechanism. Preferably the cam mechanism is so arranged as to have substantially no effect on the body during the initial stages of its motion.

Another object of the invention is to provide a ring balance meter which requires a reduced amount of sealing liquid as compared to conventional meters of the same capacity.

Other objects, advantages and novel features of the invention will be apparent from the following description when read in connection with the accompanying drawings, in which:

Figures 3 to 6 are partial diagrams showing the meter in different positions;

Figures 7 and 8 are similar diagrams showing different parts of the mechanism;

Figures 11 to 14 are partial views showing another cam construction; and

Figure 15 is an enlarged view with parts in section showing a pressure connection.

Figure 1:
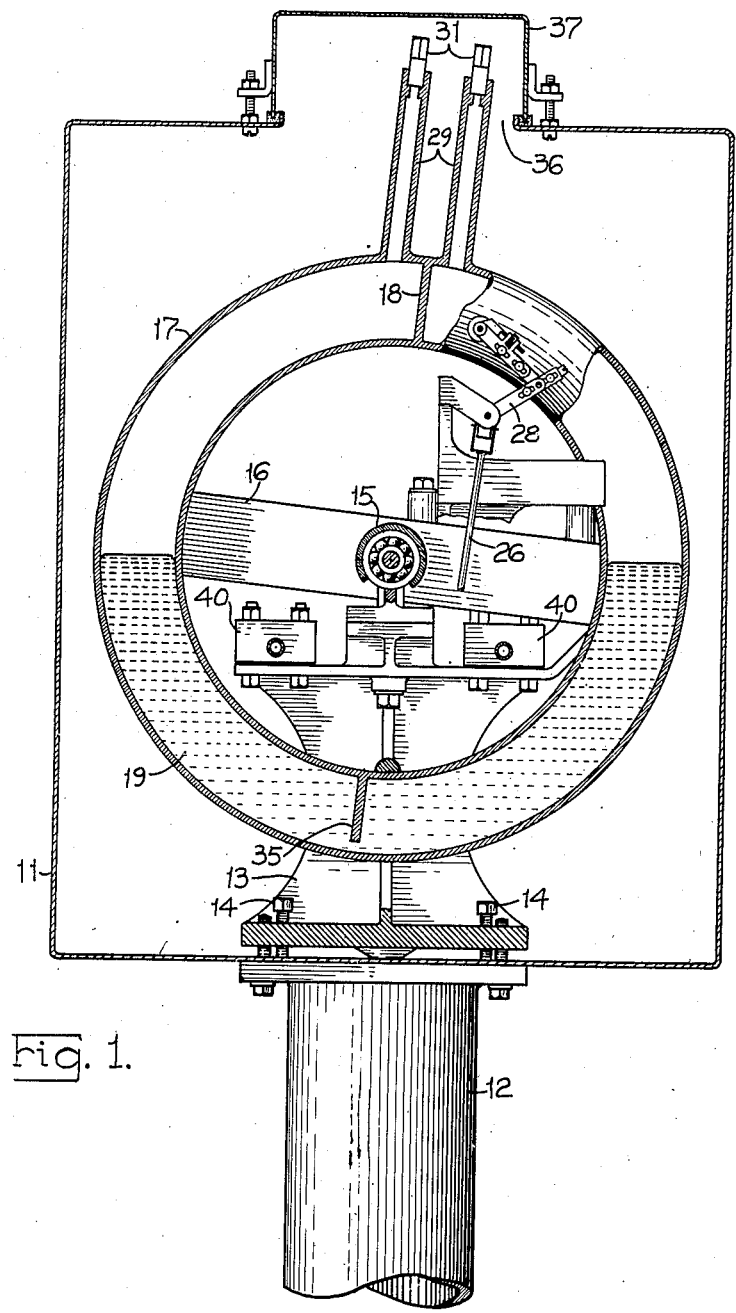
Figure 1 is a front section of a meter embodying the invention.

In the drawings the invention has been illustrated as embodied in a ring balance meter but it will be apparent that many of the features are applicable to meters of other types. As shown in Figure 1 the meter is incased in a casing 11 mounted on a pedestal 12 and includes a base 13 supported on levelling screws 14. The base carries a ball bearing 15 pivotally supporting a bar 16 which is secured to and supports an annular tubular body 17. A partition 18 is provided at the upper part of the body 17 and the lower part thereof is filled with a sealing liquid 19 such as mercury.

Figure 2:
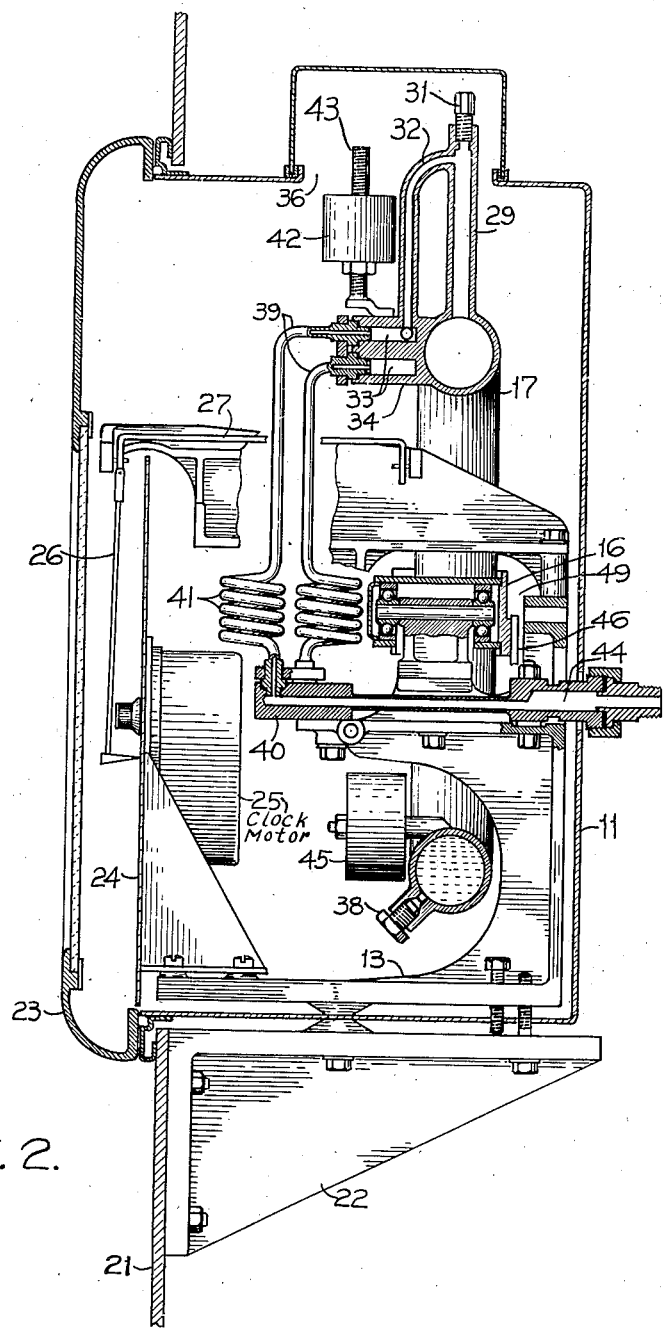
Figure 2 is a side section of the meter illustrating another mounting arrangement.

Figure 2 shows the casing 11 mounted in an opening in a panel 21 by means of a supporting bracket 22. The front of the casing is closed by a cover 23 having a glazed portion through which a chart or dial may be observed. As seen in Figure 2 a chart 24 is arranged behind the cover 23 and driven by a clock mechanism 25 and has a record made thereon by a pen 26. The pen is supported by a shaft 27 pivoted in an extension of the base 13 and rocked through an adjustable linkage 28 as the meter body 17 swings.

The meter body is connected to a source of differential pressure, for example, across an orifice in a fluid conduit, by means of vertically extending tubes 29 connected to the upper part of the meter body on opposite sides of the partition 18. The upper ends of the tubes are closed by plugs 31 which may be removed for filling the body with sealing liquid or for venting it and tubes 32 connects the upper ends of tubes 29 with passages 33 in a block 34 carried by the upper part of the meter body 17.

In the lower part of the meter body a partition 35 is formed extending from the upper wall to a point just short of the lower wall to leave a communicating passage below the partition. This partition 35 together with the tubes 29 provides a safety feature preventing blowing out of the sealing liquid until a pressure differential is reached in excess of that which the meter is designed to measure. In normal use the sealing liquid remains entirely in the meter body 17 but if an exceptionally high differential pressure should occur the sealing liquid could rise in one of the tubes 29 and the partition 35 would prevent the pressure from blowing through the sealing liquid so long as the level is above the bottom of the partition.

The upper ends of the tubes 29 extend through an opening 36 in the top of the casing 11 and a cup shaped casing member 37 may be secured over the opening 36 to close the casing. To fill or clean the meter it is only necessary to remove the casing member 37 for access to the plugs 31 and tubes 29 without disturbing any other part of the meter. For draining sealing liquid from the meter a plug 33 may be provided in the bottom of the meter body 17.

Pressure is conducted to the passages 33 in the block 34 through flexible tubes 39 secured at their upper ends to the block 34 and mounted at their lower ends on bored blocks 40 secured to the base 13 below the ball bearing 15. The tubes are shown extending radially vertically from the blocks 40 to the block 34 and are formed intermediate their ends substantially in alignment with the bearing 15 with helical portions 41. As the meter body 17 swings about its central pivot the tubes 39 will deflect in the manner of springs, most of the deflections occurring in the helical portions 41.

In operation, the tubes 39 resist oscillation of the meter body in the manner of springs and this resistance may be compensated for by providing a weight 42 threaded on a post 43 extending upwardly from the block 34. As the weight 42 is displaced from the vertical it exerts a turning force on the meter body compensating for the spring effect of the tubes 39, as shown diagrammatically in Figures 7 and 8. With this construction, slip joints are eliminated entirely without interfering in any way with the accuracy or sensitivity of the meter.

The blocks 40 are formed with passages 44 and as best seen in Figure 2, are curved to extend around the central portion of the base 13. At their outer ends the passages 44 may be connected through tubing, not shown, to a desired source of differential pressure.

The meter body is normally held in its central position by a weight 45 secured to the lower portion thereof. If desired, the size of one of the weights 42 or 45 may be decreased slightly to compensate for the opposing weight which may then be eliminated.

Motion of the meter body is resisted in addition to the weight 45 by a cam mechanism illustrated diagrammatically in Figures 3 to 6. As shown, the bar 16 has rigidly secured thereto an arm 46 formed with an engaging surface 47 terminating in a shoulder 48 aligned with the axis of rotation of the meter body. The arm 46 is engaged by a lever 49 pivoted on a stationary pivot 51 adjacent the periphery of the meter body and formed with a surface 52 overlying the surface 47. An extension 53 on the lever 49 adjustably carries a weight 54 pressing the lever against the arm 46.

The surfaces 47 and 52 are so shaped that when the meter is in its neutral position, as shown in Figure 3, and are in contact only at the shoulder 48, tangents to the surfaces at the point of contact lie at a slight angle. If the meter body turns to the position of Figure 4 its motion is resisted only by the weight 45, the surfaces 47 and 52 remaining in contact at the shoulder 48 but closing the angle between them. Preferably, this motion is caused by approximately 1% of the total differential which the meter is designed to measure which in a flowmeter corresponds to 10% of the full range flow. During the first part of the motion the weight 45 moves a distance $a$, as shown in Figure 4, and the only resistance to turning of the meter body up to this point is that which results from the displacement of the weight 45. This is desirable in a meter such, for example, as a flow meter in which the differential across an orifice is proportional to the square root of the flow. Thus the meter will have a relatively large motion during conditions of low flow velocity and will give a more accurate flow indication.

As the meter is displaced further to the position of Figure 5, the weight 45 is swung out to a horizontal distance $a'$ and the point of contact between surfaces 47 and 52 occurs at the line $x$. At this time the weight acts on the arm 46 with a leverage $b$ at a distance $c$ from the pivot 51. Thus the weight 54 acting through levers 46 and 49 exerts a relatively large force resisting turning of the meter body.

Figure 6 illustrates the parts in the position of maximum displacement with the weight 45 at a horizontal distance $a''$ from the vertical axis and with the point of engagement between surfaces 47 and 52 at $y$. At this time the lever 49 acts on the arm 46 through a lever arm $b'$ equal substantially to the full length of the arm 46 and at a distance $c'$ from the pivot 51. Thus the weight 54 has reached its maximum effectiveness. It will be noted that the point of contact between the surfaces 47 and 52 is always on a line connecting the meter body axis and the axis of pivot 51 so that true rolling contact is obtained.

It will be understood that the engaging surfaces 47 and 52 may be shaped to give any desired characteristic to the motion of the meter body. In a flow meter, for example, these surfaces would be shaped to give a motion of the meter proportional to the square root of the differential pressure, so as to provide a direct indication of the rate of flow.

Figure 9:
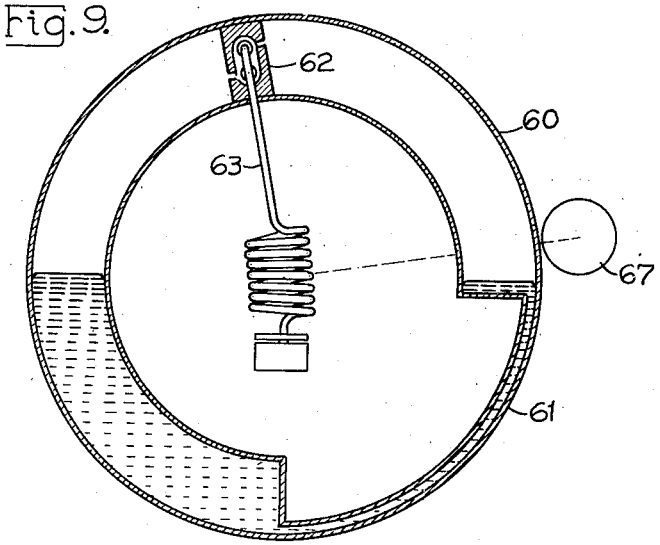
Figures 9 and 10 are diagrammatic views illustrating another meter body construction.
Figure 10:
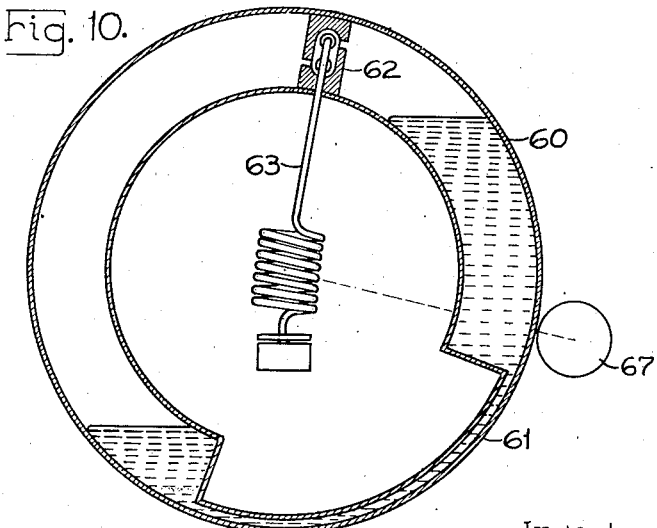

Figures 9 and 10 illustrate another construction of the meter body which may meter the same range of differential pressures as the body of Figures 1 to 8 with a considerable saving in sealing liquid. Since mercury is normally used as the sealing liquid and is quite expensive this construction results in an appreciable saving in cost without the sacrifice of any efficiency of range.

In normal operation of a ring balance meter, one quadrant of the ring is always full of sealing liquid. According to the present invention, the size of the ring through this quadrant is reduced to reduce its liquid capacity and the reduction in weight of liquid in the reduced part of the ring is compensated for by the addition of an external weight.

Figures 9 and 10 show an annular meter body 60 formed with a reduced portion 61 extending from the lower part of the high pressure side of the ring to a point just below the zero liquid level on the low pressure side of the ring. The low and high pressure sides of the ring are separated by a block 62 to which pressure is conducted by flexible tubes 63 as described above and a weight similar to the weight 42 theoretically should be provided to compensate for the bending moment of the tubes.

In order to compensate for the decreased weight of the reduced portion 61 a weight theoretically should be attached to the meter body at the reduced portion. This weight should have such a value as to rebalance the meter body so that it will again become a balanced ring the same as though it were of uniform section throughout.

Since the two theoretical weights lie on a line passing outside of the center of the meter body they may be replaced by a single weight having its center of gravity lying at the intersection of a radius through the center of the meter body and the line. However, instead of placing an actual weight at this point it is preferred to create the same effect by locating a single smaller weight at 67 adjacent the periphery of the meter body and lying on an extension of the same radius on which such weight theoretically was located. In this way a single small weight may be provided to compensate for the cut out portion of the meter body and for the bending effect of the tubes 63.

When the meter is in its zero position or is tilted slightly counterclockwise as shown in Figure 9, the mercury in the low pressure side extends slightly above the upper end of the reduced portion 61 and, of course, fills the high pressure side up to approximately its vertical center. Figure 10 shows the other extreme of movement with the mercury in the high pressure side depressed and correspondingly raised in the low pressure side. From these views it will be seen that the mercury always flows from one portion of full section to another portion of full section so that the effect is the same as if a complete ring of uniform section were provided.

Figures 11 to 14 illustrate an alternative cam construction which may be used in place of the arrangement shown in Figures 3 to 6. As shown, the meter body 68 is pivoted at 69 and is urged to neutral or zero position by a weight 71. A cam arm 72 is secured to the meter body and is formed with a curved cam surface 73 terminating at its outer end in a notch 74 with a relatively sharp point 75 at its outer extremity. A cam lever 76 is pivoted at 77 and has a cam surface 78 engaging the surface 73, there being a notch in the surface 78 to receive the point 75. The lever 76 is secured to a pointer or pen 79 to move it over a dial or chart indicated at 81.

In the zero position shown in Figure 11 the only point of contact between the cam surfaces is at the point 75. As the meter body turns to the position of Figure 12 the cams turn about the point 75 until the cam surface 78 engages the surface 73 at the opposite edge of the groove 74. This movement represents about 1% of the total differential and 10% of the total meter body movement and advances the pointer over the first part of the dial.

As the movement continues the cam surfaces roll on each other through the intermediate position of Figure 13 to the maximum position of Figure 14, the pointer 79 being moved over the dial in accordance with the cam shape and the movement of the meter body. In a flowmeter the cams are preferably so shaped as to give the pointer a movement proportional to the square root of the meter body movement to provide a uniform dial. It will be noted that in this case as with the cams of Figures 3 to 6, the cam surfaces are so shaped that the point of contact always lies on a line connecting the pivots 69 and 77 so that a true rolling contact is maintained with no sliding.

The meter body 68 is shown as turned up at its ends at 82 to provide upwardly extending tubes for connection to pressure pipes 83. The upper end of each tube is closed by a plug 84 having a cross bore 85 communicating with the pressure pipe and an axial bore 86 terminating in a valve seat. A valve cage 87 is secured to the plug and loosely holds a valve 88 adapted to close the bore 86. The valve is formed of a material which will sink in water but will float in mercury, the valve shown being molded from plastic material and carrying a steel tip to seat on the valve seat.

If an excessively high differential pressure should occur such as to force mercury from the meter body into one of the tubes 82, the valve will float up to its closed position. This will prevent the mercury from being blown out of the meter. It will be understood that similar valves could be placed in the tubes 29 of Figures 1 and 2 if desired.

While several embodiments of the invention have been shown and described in detail it will be understood that various changes might be made therein and that the drawings and description are not intended to be a definition of the limits of the invention, reference being had for this purpose to the appended claims.

What is claimed is:

1. A meter comprising a hollow body adapted to contain a sealing liquid, means mounting said body for pivotal movement about a horizontal axis, and flexible pressure connections for said body including tubes fixedly mounted at their lower ends on a fixed part of the apparatus and connected to said body at their upper ends and extending radially of the pivotal mounting, said tubes having helical portions, substantially alined with the pivotal axis of the body, at which the tubes are adapted to bend.

2. A meter comprising a hollow body adapted to contain a sealing liquid, means mounting said body for pivotal movement about a horizontal axis, and flexible pressure connections for said body including tubes fixedly mounted at their lower ends and connected to said body at their upper ends and extending radially of the pivotal mounting, and a weight carried by said body vertically above its pivotal mounting when the body is in its neutral position and counterbalancing the bending moment in the tubes as the body is swung about its pivot.

3. A meter comprising an annular hollow body adapted to contain a sealing liquid and having a partition in its upper portion, means mounting said body substantially at its center for pivotal movement about a horizontal axis, and pressure connections for said body including a pair of tubes alined in a plane passing through the pivotal axis and connected at one end to the upper part of the body on opposite sides of the partition, means fixedly mounting the lower ends of the tubes below the pivotal axis, and a weight secured to the body vertically above its pivotal axis when the body is in its neutral position to counterbalance the bending moment in the tubes as the body is swung about its pivot.

4. A meter comprising a meter body mounted for pivotal movement about a horizontal axis, an arm secured to said body and extending substantially radial thereto, and a lever pivoted on a fixed pivot parallel to the body axis adjacent the outer end of the arm, said arm and lever having engaging surfaces curved to provide a cam action varying the effective point of engagement between the arm and lever as the body swings about its pivot, said surfaces being so shaped as to maintain their point of contact on a line connecting the pivot and the axis.

5. A meter comprising a meter body mounted for pivotal movement about a horizontal axis, an arm secured to said body and extending substantially radial thereto, and a lever pivoted on a fixed pivot parallel to the body axis adjacent the outer end of the arm, said arm and lever having engaging surfaces curved to provide a cam action varying the effective point of engagement between the arm and lever as the body swings about its pivot, one of said surfaces terminating in an abrupt edge forming the sole point of engagement between the surfaces during initial movement of the meter body.

6. A meter comprising a meter body mounted for pivotal movement about a horizontal axis, an arm secured to said body and extending substantially radial thereto, and a lever pivoted on a fixed pivot parallel to the body axis adjacent the outer end of the arm, said arm and lever having engaging surfaces curved to provide a cam action varying the effective point of engagement between the arm and lever as the body swings about its pivot, one of said surfaces terminating in an abrupt edge forming the sole point of engagement between the surfaces during initial movement of the meter body, and the surfaces being so shaped as to maintain their point of contact on a line connecting the pivot and the axis, thereby to provide rolling contact.

7. A meter comprising a meter body mounted for pivotal movement about a horizontal axis, an arm secured to said body and extending substantially radial thereto, and a lever pivoted on a fixed pivot parallel to the body axis adjacent the outer end of the arm, said arm and lever having engaging surfaces curved to provide a cam action varying the effective point of engagement between the arm and lever as the body swings about its pivot, the arm having a notch adjacent its outer end and terminating in a relatively sharp edge engageable with the cam surface on the lever whereby the sharp edge provides the sole point of engagement between the cam surfaces during a portion of the movement of the meter body.

8. A meter comprising a meter body mounted for pivotal movement about a horizontal axis, an arm secured to said body and extending substantially radial thereto and normally lying in a substantially horizontal position, and a weighted lever pivoted on a fixed pivot parallel to the body axis adjacent the outer end of the arm and overlying the arm, said arm and lever having engaging surfaces at least one of which is curved to provide a cam action varying the effective point of engagement between the arm and lever as the body swings about its pivot and at least one of said engaging surfaces terminating at a point in vertical alinement with the pivotal axis of the body.

9. A meter comprising a meter body mounted for pivotal movement about a horizontal axis, an arm secured to said body and extending substantially radial thereto and normally lying in a substantially horizontal position, and a weighted lever pivoted on a fixed pivot parallel to the body axis adjacent the outer end of the arm and overlying the arm, said arm and lever having engaging surfaces at least one of which is curved to provide a cam action varying the effective point of engagement between the arm and lever as the body swings about its pivot, the engaging surface on said arm terminating at the pivotal axis of the body, and a weight secured to the body to move it to neutral position, said engaging surfaces lying at an angle at their point of engagement when the body is in neutral position so that said camming action does not become effective until the body has swung an amount greater than said angle.

10. A ring balance meter comprising an annular hollow meter body adapted to contain a sealing liquid and having a partition in its upper portion dividing it into a low pressure side and a high pressure side, said body being of reduced cross section from the lower part of the high pressure side to the upper part of the low pressure side, radially extending pressure tubes connected at one end respectively to the upper parts of the low and high pressure sides and adapted to bend as the body turns about its axis, means fixedly mounting the other ends of the tubes adjacent the axis of the body and a single weight secured to the body to compensate for the reduced weight of said portion of reduced cross section and for the bending moment of said tubes.

11. In a meter, an annular meter body adapted to contain a sealing liquid and having a partition in its upper portion dividing it into a low pressure side and a high pressure side, means mounting the body for pivotal movement about its center, pressure conduits extending between a fixed part of the apparatus and the upper parts of the low and high pressure sides respectively, the body being of reduced cross section from the lower part of the high pressure side to a point relatively higher up on the low pressure side, and a weight secured to the body to compensate for the reduced weight of the portion of reduced cross section.

12. A meter comprising an annular body adapted to contain a sealing liquid and divided at its upper portion, means mounting the body for pivotal movement about a horizontal axis, rigid tubes extend upwardly from the top of said body on opposite sides of the division, and flexible pressure conduits connected between fixed parts of the apparatus and said tubes and communicating with the tubes adjacent their tops, the upper ends of said tubes being formed with normally closed filling openings.

13. A meter comprising an annular body adapted to contain a sealing liquid and divided at its upper portion, means mounting the body for pivotal movement about a horizontal axis, rigid tubes extending upwardly from the top of said body on opposite sides of the division, flexible pressure conduits connected between fixed parts of the apparatus and said tubes and communicating with the tubes adjacent their tops, a casing surrounding said body and having an opening in its top through which the upper ends of the tubes and the conduits extend, and a cup-shaped cover removably fitting over said opening, the upper ends of said tubes being formed with normally closed filling openings.

ROBERT A. ACKLEY.

CERTIFICATE OF CORRECTION.

Patent No. 2,331,153. October 5, 1943.

ROBERT A. ACKLEY.

It is hereby certified that error appears in the printed specification of the above numbered patent requiring correction as follows: Page 2, first column, line 5, for "plug 33" read --plug 38--; page 3, first column, line 1, after the word "line" and before the period, insert --connecting the weights--; and that the said Letters Patent should be read with this correction therein that the same may conform to the record of the case in the Patent Office.

Signed and sealed this 14th day of December, A. D. 1943.

(Seal)
Henry Van Arsdale,
Acting Commissioner of Patents.